United States Patent
Kureya (10) Patent No.: US 6,334,138 B1
(45) Date of Patent: Dec. 25, 2001

(54) METHOD FOR PERFORMING ALLTOALL COMMUNICATION IN PARALLEL COMPUTERS

(75) Inventor: Kimihide Kureya, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/265,558

(22) Filed: Mar. 9, 1999

(30) Foreign Application Priority Data

Mar. 13, 1998 (JP) .................................................. 10-062483

(51) Int. Cl.[7] ...................................................... G06F 13/00
(52) U.S. Cl. ............................. 709/201; 709/313; 712/11; 712/14; 712/28
(58) Field of Search .................................... 709/200, 201, 709/205, 212, 218, 230, 238, 250, 313; 712/10, 11, 14, 28

(56) References Cited

U.S. PATENT DOCUMENTS

| | | | |
|---|---|---|---|
| 5,170,393 | * 12/1992 | Peterson et al. ..................... | 370/255 |
| 5,367,692 | * 11/1994 | Edelman ............................... | 712/22 |
| 5,617,538 | * 4/1997 | Heller ................................... | 709/245 |
| 5,694,602 | * 12/1997 | Smith ................................... | 709/105 |
| 5,859,981 | * 1/1999 | Levin et al. ....................... | 395/200.68 |

* cited by examiner

Primary Examiner—Viet D. Vu
(74) Attorney, Agent, or Firm—Antonelli, Terry, Stout & Kraus, LLP

(57) ABSTRACT

The present invention reduces the processing time required for alltoall communications in a parallel computer. When performing alltoall communications in a parallel computer, the number of transfer data units and the number of computers are used as parameters to select between a method where a temporary work buffer is allocated in the memory of each computer and non-contiguous data is exchanged between computers and a method where data is exchanged between computers without allocating temporary work buffers.

5 Claims, 7 Drawing Sheets

|  | Computer 0 | Computer 1 | Computer 2 | Computer 3 | Computer 4 | Computer 5 |
|---|---|---|---|---|---|---|
| Step 0 | Computer 0 | Computer 1 | Computer 2 | Computer 3 | Computer 4 | Computer 5 |
| Step 1 | Computer 1 | Computer 0 | Computer 3 | Computer 2 | Computer 5 | Computer 4 |
| Step 2 | Computer 2 | Computer 3 | Computer 0 | Computer 1 | Computer 6 | Computer 7 |
| Step 3 | Computer 3 | Computer 2 | Computer 1 | Computer 0 | Computer 7 | Computer 6 |
| Step 4 | Computer 4 | Computer 5 | Computer 6 | Computer 7 | Computer 0 | Computer 1 |
| Step 5 | Computer 5 | Computer 4 | Computer 7 | Computer 6 | Computer 1 | Computer 0 |
| Step 6 | Computer 6 | Computer 7 | Computer 4 | Computer 5 | Computer 2 | Computer 3 |
| Step 7 | Computer 7 | Computer 6 | Computer 5 | Computer 4 | Computer 3 | Computer 2 |

| Number of computers | 8 | 16 | 32 | 64 | 128 | 256 |
|---|---|---|---|---|---|---|
| Data units | a | b | c | d | e | f |

|  | Computer 0 | Computer 1 | Computer 2 | Computer 3 | Computer 4 | Computer 5 | Computer 6 | Computer 7 |
|---|---|---|---|---|---|---|---|---|
| Step 1 | Computer 1 | Computer 0 | Computer 3 | Computer 2 | Computer 5 | Computer 4 | Computer 7 | Computer 6 |
| Step 2 | Computer 2 | Computer 3 | Computer 0 | Computer 1 | Computer 6 | Computer 7 | Computer 4 | Computer 5 |
| Step 3 | Computer 4 | Computer 5 | Computer 6 | Computer 7 | Computer 0 | Computer 1 | Computer 2 | Computer 3 |

(B)

METHOD FOR PERFORMING ALLTOALL COMMUNICATION IN PARALLEL COMPUTERS

BACKGROUND OF THE INVENTION

The present invention relates to a method of data communication between a plurality of computers, including parallel computers connected to a network. More specifically, the present invention relates to a method of speeding up Alltoall communications in a message passing interface MPI, which is a standard interface for data communication between computers.

Parallel computers can be broadly divided into distributed-memory parallel computers and shared-memory parallel computers. Distributed-memory parallel computers are currently more popular since they offer greater ease in scalability. The programming model for standard distributed-memory parallel computers usually involves a message-passing model. In a message-passing model, programs must explicitly specify communication functions. In other words, if data to be used in a computation is not present on the local computer, data transfer is performed by issuing a send function to the computer that holds the data and by issuing a receive function at the local computer.

In order to standardize the interface for these communication functions, the MPI Forum recently put together specifications for a message-passing interface known as MPI (Message Passing Interface). In addition to one-to-one communications between a pair of computers, MPI defines collective communications that take place between all computers. This type of collective communication includes a form of communication known as Alltoall communication. Alltoall communications involve a communication operation where each computer sends distinct data to each sending computer and is used in matrix transposition and n-body problems. The following is a description of the Alltoall function interface. Some of the arguments are simplified to facilitate the discussion. The name and arguments of the Alltoall function are as follows.

Alltoall (sendbuf, sendcount, sendtype, recvbuf, recvcount, recvtype)

The arguments sendbuf, sendcount and sendtype refer, respectively, to the starting address at the local computer holding the data array to be sent, the number of data units to be sent to each computer, and the data type. The arguments recvbuf, recvcount and recvtype refer, respectively, to the starting address at the local computer holding the data to be received, the number of data units to be received from each computer, and the data type. Possible data types include INTEGER, which represents integers, REAL, which represents real numbers, and COMPLEX, which represents complex numbers. In order to be able to clearly identify communication targets, MPI assigns each computer an identification number referred to as its rank and this rank is used to specify the communication target. In the following presentation, a computer assigned rank n is referred to as the computer n.

Figure 4:
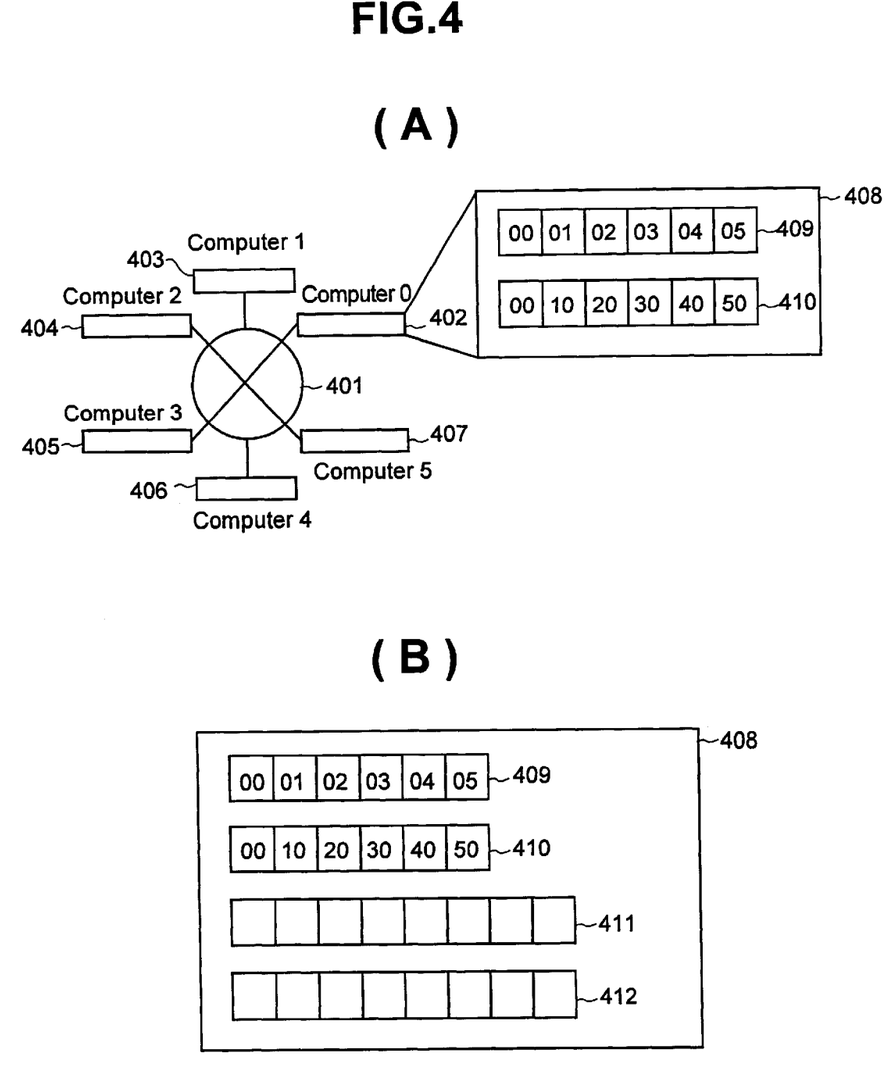
FIG. 4(A) is a schematic diagram of an embodiment of a parallel computer system.
FIG. 4(B) is a diagram of a data storage arrangement.

FIG. 4 (A) shows a parallel computer in which six computers (numbered 402 through 407 and representing the computer 0 through the computer 5) are connected via a network (401). A detail drawing 408 shows the memory regions in the computer 0. Data arrays 409, 410 are the data arrays stored in the sendbuf send buffer and the recvbuf receive buffer, respectively, as specified by the parameters to Alltoall. The i-th unit 0i (where i is a number from 0 to 5) in the data array 409 is the data to be sent by the computer 0 to the computer i. The computer 0 stores data received from the computer i to the i-th unit i0 (where i is a number from 0 to 5) to the data array 410.

Figure 2:
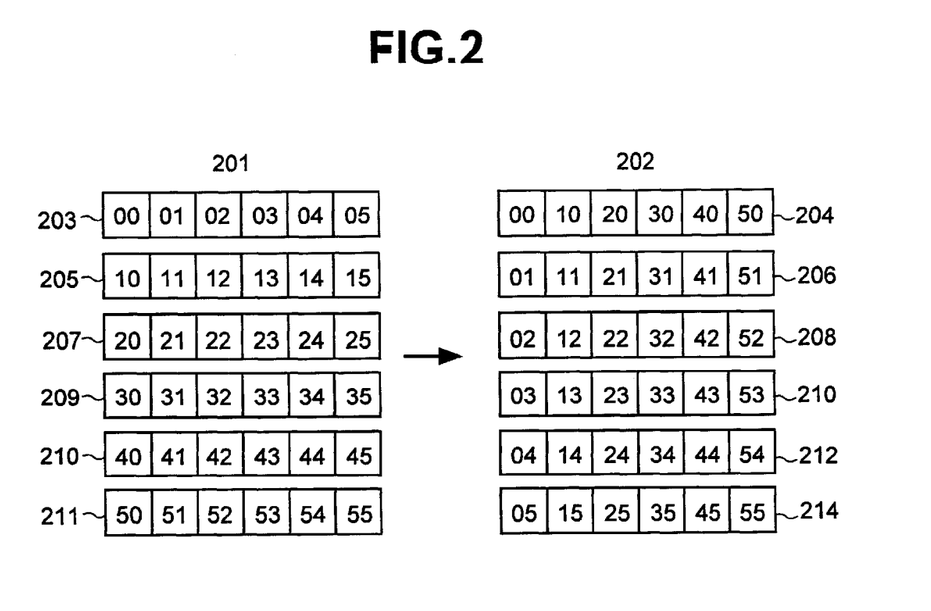
FIG. 2 is a diagram for the purpose of describing how Alltoall communication is performed.

FIG. 2 is a representation of the data transfer operation performed in Alltoall communication between the six computers. Reference numeral 201 denotes the data arrays stored in the send buffer of each computer before Alltoall communications are begun, as ordered by rank. Reference 202 denotes the data arrays stored in the receive buffer of each computer after Alltoall communications have been performed, as ordered by rank. In this figure, data arrays 203, 205, 207, 209, 211, 213 represent the data in the send buffers of the computer 0 through the computer 5, respectively. Data arrays 204, 206, 208, 210, 212, 214 represent the data in the receive buffers of the computer 0 through the computer 5, respectively.

The following is a description of a sample data array transfer operation performed by the computer 0. The following send operations are performed by the computer 0.

(a) The 0-th unit 00 in the send buffer 203 is sent to the 0-th unit in the local receive buffer 204.

(b) The first unit 01 in the send buffer 203 is sent to the 0-th unit in the receive buffer 206.

(c) The second unit 02 in the send buffer 203 is sent to the 0-th unit in the receive buffer 208.

(d) The third unit 03 in the send buffer 203 is sent to the 0-th unit in the receive buffer 210.

(e) The fourth unit 04 in the send buffer 203 is sent to the 0-th unit in the receive buffer 212.

(f) The fifth unit 05 in the send buffer 203 is sent to the 0-th unit in the computer 5 of the receive buffer 214.

The following receive operations are performed by the computer 0.

(a) The 0-th unit 00 from the send buffer 203 at the local computer is received in the 0-th unit of the receive buffer 204.

(b) The 0-th unit 10 from the send buffer 205 at the first computer is received in the first unit of the receive buffer 204.

(c) The 0-th unit 20 from the send buffer 207 at the second computer is received in the second unit of the receive buffer 204.

(c) The 0-th unit 30 from the send buffer 209 at the third computer is received in the third unit of the receive buffer 204.

(e) The 0-th unit 40 from the send buffer 211 at the fourth computer is received in the fourth unit of the receive buffer 204.

(f) The 0-th unit 50 from the send buffer 211 at the fifth computer is received in the fifth unit of the receive buffer 204.

In general, the j-th unit from the send buffer at the computer i is sent to the i-th unit in the receive buffer of the computer j, and the i-th unit from the computer j is received in the j-th unit of the receive buffer at the computer i. In other words, looking at the figures showing the data from the send and receive buffer of each computer, the Alltoall function involves a manner of transferring data similar to performing a matrix transpose operation.

For parallel computers in which the computers can perform one-to-one communication with each other, Japanese laid-open patent publication number 8-263449 describes a method of allowing each computer to send data to all other computers. This method can be used to implement Alltoall communications in parallel computers. This method does not include an operation for the computer to send data to itself, but Alltoall communication can be performed in a parallel manner by adding an operation to send data to itself. Using this method along with this additional operation of sending data to itself, n computers require $2^{}L$ steps to perform the data transfer (with L being a positive integer where $2^{}(L-1)<n>=2^{}L$). Data transfer is performed by having, at each step, each computer communicating with the computer assigned to a rank number resulting from an exclusive OR operation performed on the binary representation of the local computer rank number from 0 to n−1 and the binary representation of the step number from 1 to $2^{}(L-1)$.

Figure 3:
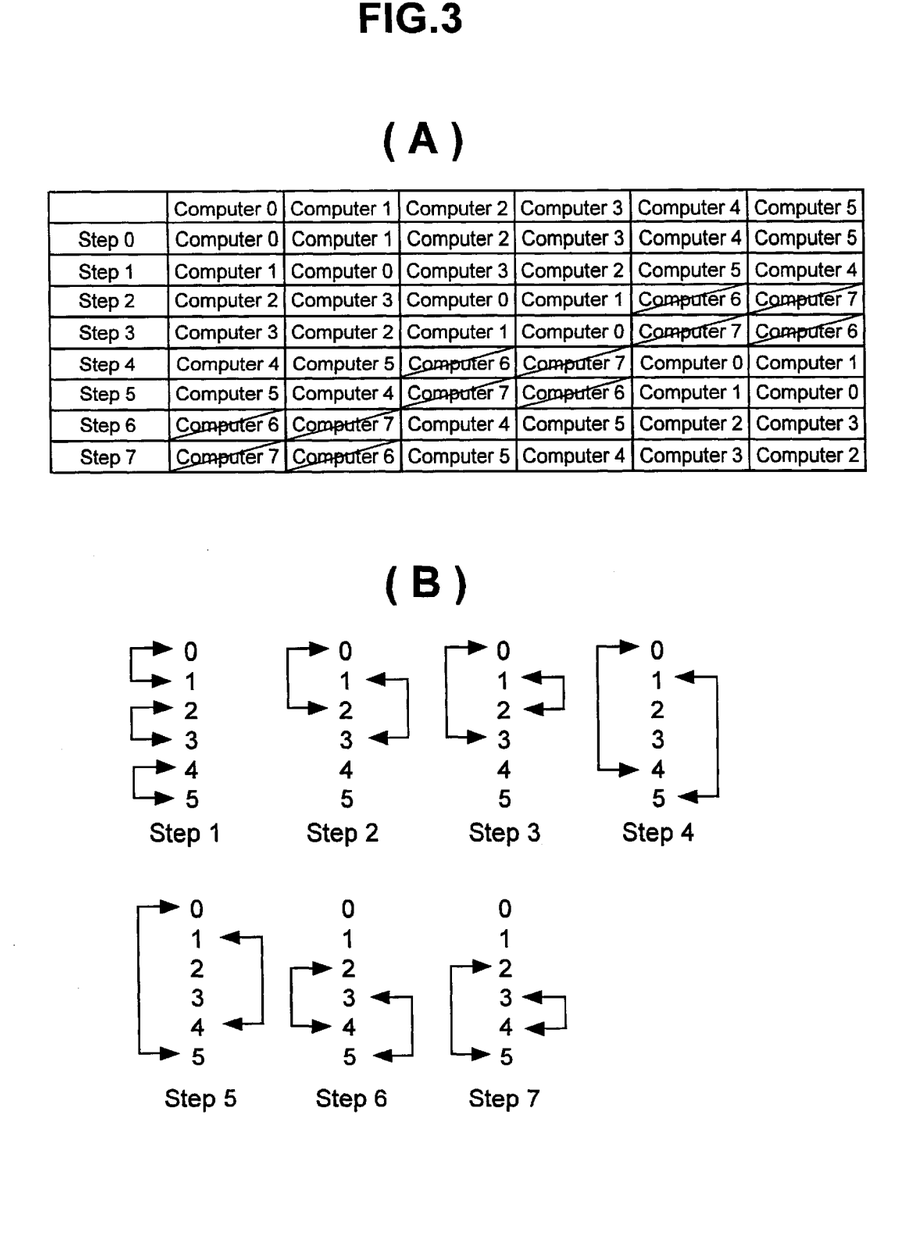
FIG. 3(A) and FIG. 3(B) are diagrams for the purpose of describing a pairwise method for Alltoall communications.

The following is a description of a specific example of this method when used with six computers ($2^{}2<6<=2^{}3$) as shown in FIGS. 3(A) and 3(B). FIG. 3(A) is a table showing, for each computer, the communication target computer at each step. For example, at step 2, the binary representation of the rank of each computer (0, 1, 2, 3, 4, 5) would be (000, 001, 010, 011, 100, 101). Taking the exclusive OR of these values and the binary representation of step number 2 results in (010, 011, 000, 001, 110, 111). In other words, the communication targets for the computers (0, 1, 2, 3, 4, 5) at step 2 are the computers (2, 3, 0, 1, 6, 7). Since the j-th unit from the send buffer of a computer i must be sent to the i-th unit in the receive buffer of a computer j, the following communication operations are performed at step 2.

(a) The computer 0 sends the second unit 02 from its send buffer to the 0-th unit in the receive buffer of the computer 2.

(b) The computer 1 sends the third unit 13 from its send buffer to the first unit in the receive buffer of the computer 3.

(c) The computer 2 sends the 0-th unit 20 from its send buffer to the second unit in the receive buffer of the computer 0.

(d) The computer 3 sends the first unit 31 from its send buffer to the third unit in the receive buffer of the computer 1.

Since the communication targets for the computers (4, 5) are the computers (6, 7), which do not exist, the computers (4, 5) must wait until the communication operations for the computers (0, 1, 2, 3) are completed. With operations being performed as in step 2 for the other steps, six computers would complete communication operations after seven ($=2^{}3-1$) steps using this method. FIG. 3(B) shows the data exchanges performed at each step according to FIG. 3(A). When the operation for step 0** (each computer sends the i-the unit ii from its send buffer to the i-th unit in the receive buffer) is added to send data to the local computer, this method achieves Alltoall communication in eight steps. This method is referred to as the pairwise method in this specification.

With the pairwise method described above, the number of communication steps required for Alltoall communications in n computers is a power of 2. This means that the processing time increases in proportion to the number of computers.

SUMMARY OF THE INVENTION

The object of the present invention is to speed up Alltoall communications by providing two methods depending on the number of data units to be transferred. If a small number of data units are to be transferred, a work buffer is set up to provide a method requiring fewer communication steps compared to the conventional technology. If a large number of data units are to be transferred, the conventional method is used.

To achieve the object described above, the present invention performs communication by using the number of transfer data units and the number of computers as references for selecting between a pairwise method that does not use work buffers and a communication method requiring fewer communication steps, where at each communication step, non-contiguous data is formed from saved data at each computer, in which each computer allocates a work buffer separate from a receive buffer, and non-contiguous data is transferred to the work buffer.

DESCRIPTION OF THE PREFERRED EMBODIMENTS

The following is a description, with reference to the drawings, of an Alltoall communication method according to the present invention. In accordance with the present invention, Alltoall communications are sped up by using a method known as the hypercube algorithm to determine a communication target for each communication step and by transferring data through a newly created temporary work buffer. A first temporary buffer 411 and a second temporary buffer 412 are dynamically allocated during execution, as shown in FIG. 4(B).

In the hypercube algorithm, when there are n computers, data on a local computer and data on a communication target computer are exchanged. At each step, the rank number of the communication target computer is the result of an exclusive OR operation between the binary representation of the local computer rank number and the binary representation of a counter variable having an initial value of 1. This operation is repeated for log n steps while doubling the counter variable. The hypercube algorithm is a method that can be used only if the number of computers corresponds to a power of 2.

Figure 8:
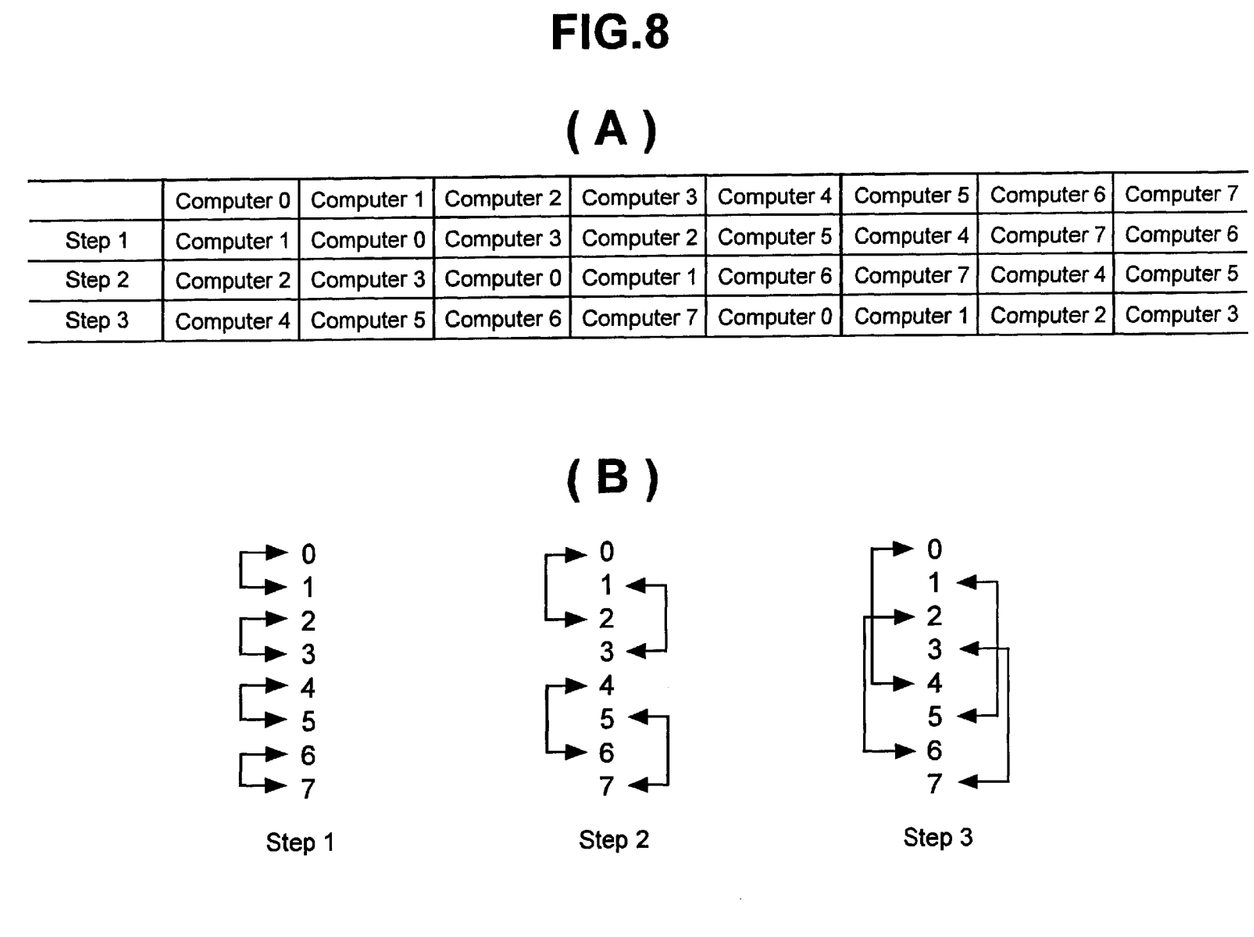
FIG. 8(A) and FIG. 8(B) are diagrams for the purpose of describing the hypercube algorithm.

FIG. 8(B) shows the data transfers performed at each step based on the table in FIG. 8(A). However, if each computer is to send distinct data for each sending computer, as in Alltoall communications, the hypercube algorithm cannot be used directly. The present invention allows the hypercube algorithm to be used by transferring non-contiguous data. The following is a description, with reference to FIG. 5, of a method for performing Alltoall operations according to the present invention using six computers. To facilitate the description, both sendcount and recvcount are set to 1 for all computers. The first temporary buffers buffer (50–506) and the second temporary buffers vbuffer (507 for the computer 2, 508 for the computer 3) are prepared beforehand for each computer to receive data from eight computers (including itself).

First, data from the send buffers in each computer is sent to the temporary buffer (buffer 411). Buffers 507, 508 are the second temporary buffers (vbuffer 412) allocated by the computer 2 and the computer 3, respectively. In the embodiment shown in FIG. 5, there are six computers, but operations are performed with the assumption that there are eight virtual computers, where 8 is the smallest power of 2 greater than 6. Specifically, the vbuffer in the computer 2 is used in place of a buffer for a computer 6, and the vbuffer in the computer 3 is used in place of a buffer for a computer 7.

Figure 5:
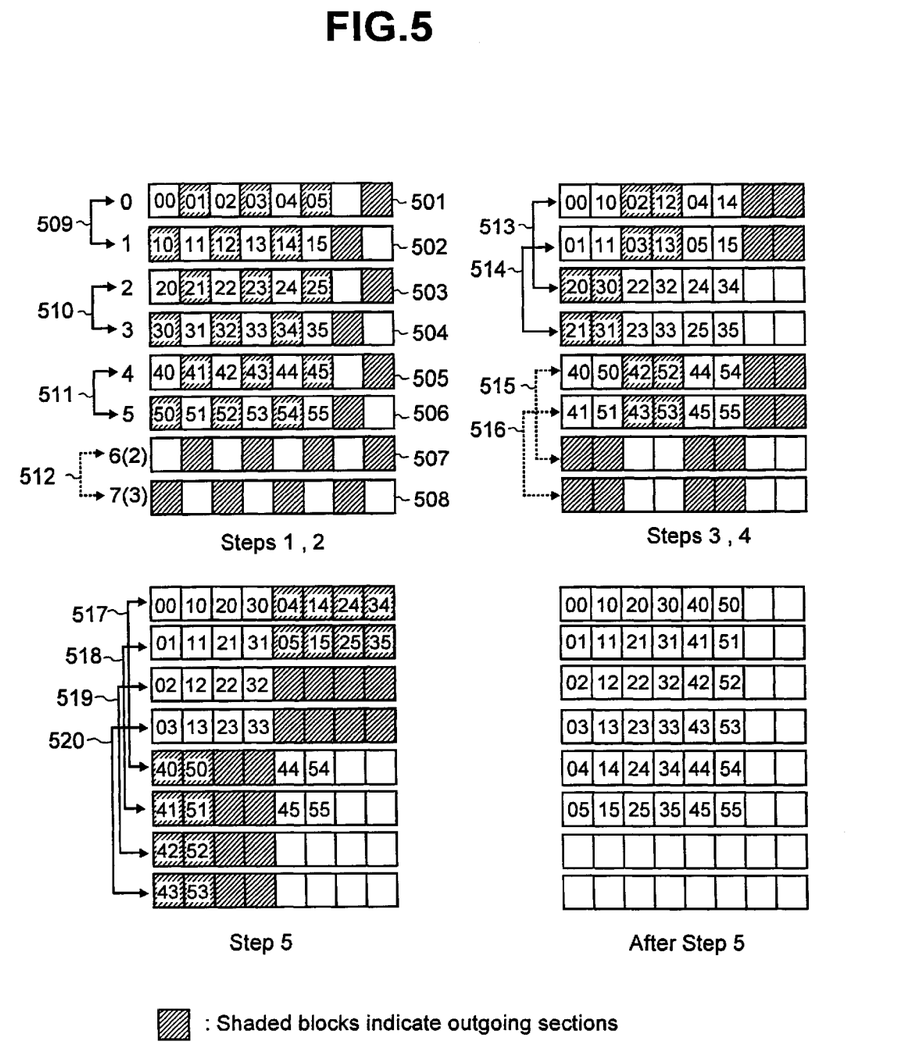
FIG. 5 is a flow diagram showing an intermediate state in Alltoall communications for the purpose of describing the embodiment of the invention.

As shown by the cross-hatched sections in step 1, non-contiguous data from every other unit is transferred. In the computers 0, 2, 4, 6 (actually 2), data starting with a position offset by one data unit from the start of the temporary buffer is sent. In the computers 1, 3, 5, 7 (actually 3), data starting with the start of the temporary buffer is sent. First, data exchanges are performed between the computers 0 and 1 (509), the computers 2 and 3 (510), and the computers 4 and 5 (511). Once step 1 is completed, data in the vbuffers for the computer 2 and the computer 3 are exchanged in step 2 (512).

In step 3, non-contiguous data consisting of pairs of adjacent data (the gray sections in FIG. 5) are exchanged. In the computers 0, 1, 4, 5, data starting with a position offset by two data units from the start of the temporary buffer are sent. In the computers 2, 3, 6 (actually 2), 7 (actually 3), data from the start of the temporary buffer is sent. Once the data exchanges between the computers 0 and 2 (513) and the computers 1 and 3 (514) have taken place, data exchanges are performed in step 4 between the computers 4 and 6 (actually 2) (515), and the computers 5 and 7 (actually 3) (516). The data exchanges for the computer 6 (actually 2) and the computer 7 (actually 3) in steps (515) and (516) are performed in vbuffers.

At step 5, data types consisting of four contiguous data units (the gray sections in FIG. 5) are exchanged. In the computers 0, 1, 2, 3, data at positions offset by four data units from the start of the temporary buffer is sent. In the computers 4, 5, 6 (actually 2), 7 (actually 3), data at the start of the temporary buffer is sent. Data is exchanged between the computers 0 and 4 (517) and between the computers 1 and 5 (518) using the temporary buffer (buffer). The data exchanges between the computer 2 and itself and the computer 3 and itself are performed using the buffer buffer (vbuffer) and the temporary buffer (buffer).

Finally, after step 5, the Alltoall communication is completed when the computers move the data in their respective temporary (buffers) buffers to their respective receive buffers.

Figure 1:
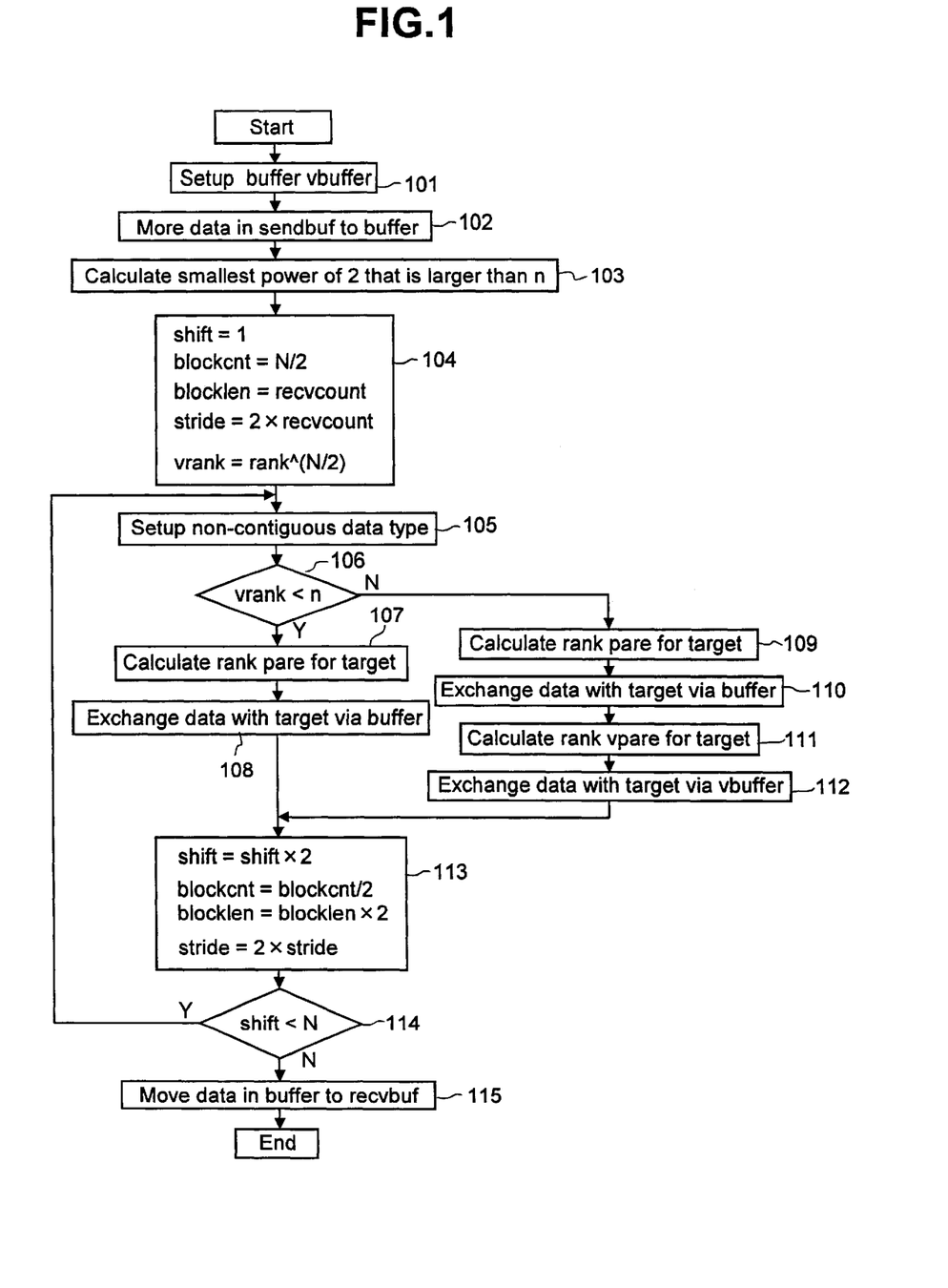
FIG. 1 is a flowchart of the processing according to an embodiment of the present invention.

The following is a description, with reference to the flowchart in FIG. 1, of how Alltoall communications are performed with any number of computers, where the example involving six computers is generalized. In this example, n computers are active. Temporary buffers (buffer and vbuffer) are set up to hold data received from other computers (101). The data in the sendbuf send buffer is moved to the buffer (102). Since the number of computers n is not necessarily a power of 2, the smallest power of 2 greater than n is assigned to N so that the hypercube algorithm can be used (103). Various variables 104 are initialized as follows: shift=1; blockcnt=N/2; blocklen=recvcount, stride=2×recvcount, vrank=rank ^ (N/2) (^ represents exclusive OR). Shift is a counter variable used to determine when to exit from the loop. Blockcnt, blocklen and stride are variables needed for forming non-contiguous data types from the original data. In the non-contiguous data type referred to here, elements called blocks, in which a number of original data units are arranged contiguously, are arranged at equal intervals, and blocks not containing data are included between these elements. Blockcnt is the number of blocks, blocklen is the number of units from the original data in one block, and stride is a number representing the interval between the start of individual blocks in terms of the number of original data units. For example, in step 1 in FIG. 5, blockcnt=4, blocklen=1, and stride=2. The variable vrank is the communication target with which data is exchanged in the final step of the hypercube algorithm. MPI uses a Type_vector function to form non-contiguous data types as shown in FIG. 5. The interface to the Type_vector function is as follows.

Type_vector(count, blocklen, stride, oldtype, newtype) Here, count, blocklen, and stride represent the same variables as described above, oldtype is a parameter indicating the data type of the original data that are contained in the blocks (here, the recvtype specified in the parameters to Alltoall), and newtype is a pointer to the non-contiguous data type created by the Type_vector function. Thus, for example, this Type_vector function can be used to create a non-contiguous data type (105). The value of vrank is compared to the number n of active computers (106), since if vrank indicates a number higher than n, a buffer (vbuffer) must be set up for a non-existing computer in place of a temporary buffer (buffer). If vrank is not greater than n, the computer need only exchange its own data with a communication target. If a bit-wise AND operation between the rank number and shift results in 1, the rank number for the communication target pare is defined as pare=rank−shift, while if the logical AND results in 0, pare=rank+shift (107). However, if pare is greater than or equal to n, there will be no actual computer that has that rank number. Therefore, the rank number pare for the communication target will be the logical OR of pare and N/2. Each computer compares its own rank number (rank) with the rank number (pare) of the communication target. If rank<pare, data offset from the start of the temporary buffer (buffer) by shift×recvcount is exchanged with the communication target. If an MPI communication function is used to exchange data, the data type to be transferred must be specified in the parameters to the communication function. In this case, the newtype data type, created at step 105, is specified for the communication function.

If rank>=pare, data at the starting position of the temporary buffer (buffer) is exchanged (108). If vrank is greater than or equal to n, data exchange is performed (109, 110) by calculating the rank number (pare) for the sending target in the same manner as in steps 107, 108. A sending target rank number (vrank) is determined in the same manner as in step 109 to obtain a vrank for exchanging data with a computer that does not actually exist (111), and the data in vbuffer is exchanged with the sending target (112). Once the data exchange operations as described above are completed, the following operations are performed: shift=shift×2, blockcnt=blockcnt/2, blocklen=blocklen×2, stride=stride×2

(113). The values of shift and N are then compared (114). If shift is less than N, the operations starting at step 105 are repeated. If shift is greater than or equal to N, each computer moves data in its temporary buffer (buffer) to recvbuf and the operation is completed (115).

As described above, when there are n computers and $2^{}(L-1) < n <= 2^{}L$ (where L is a positive integer), the hypercube algorithm as described above performs communication operations in L steps using temporary buffers. Two data exchanges take place in one step, but 4L communications take place in the hypercube algorithm since a single data exchange involves sending from the local computer to the target computer and receiving from the target computer to the local computer, thus resulting in a total of two communications. When the communication operation performed at the beginning to move the data in the send buffer to the temporary buffer and the final operation to move data from the temporary buffer to the send buffer are added, a total of 4L+2 communication operations take place. In the pairwise method, $2^{}L$ steps take place, but for each step there is a total of two communications involving sending data from the local computer to the target computer and receiving data from the target computer to the local computer. Thus, the total number of communications is $2^{}(L+1)$. If n is large, the hypercube algorithm can perform operations with far fewer communication operations. However, since memory for workspaces are required, there is an increase in processing time needed to allocate workspace memory. Also, the hypercube algorithm performs data transfers of non-contiguous data, but transfer of non-contiguous data is generally more expensive than transfer of contiguous data. Thus, the advantages of the hypercube algorithm in reducing the number of communication operations are canceled out. Therefore, the number of computers and the number of data units are used as parameters to switch between the hypercube algorithm and the pairwise method.

Figure 6:
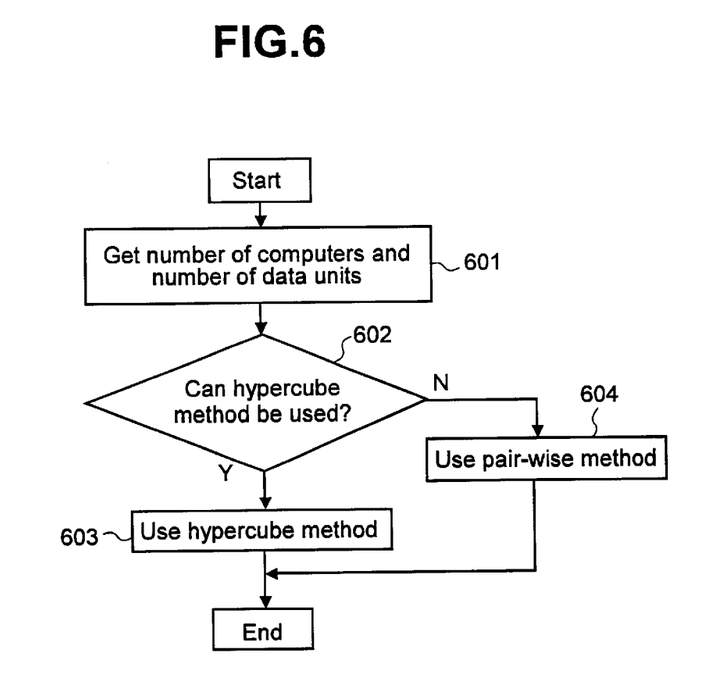
FIG. 6 is a flowchart showing operations to switch between the pairwise method and the method according to the present invention depending on the number of computers and the number of transfer data units.

FIG. 6 shows a flowchart providing an overall representation of an implementation of Alltoall that takes these factors into account. When the Alltoall function is called, the number of data units to be transferred and the number of computers are obtained (601). A table prepared beforehand is used to determine whether the hypercube algorithm or the conventional method is more advantageous (602).

Figure 7:
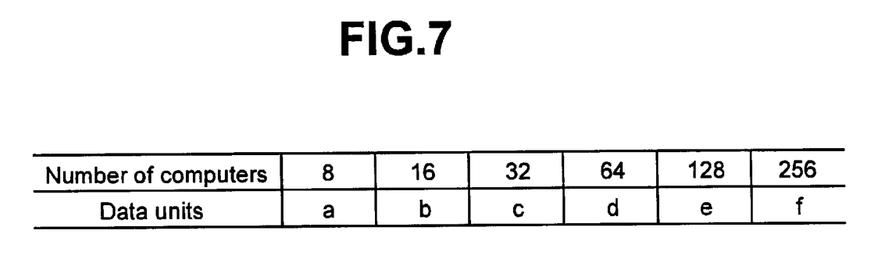
FIG. 7 is a table used to decide between the hypercube algorithm and the conventional method.

FIG. 7 shows an example of a table created to compare the two methods. Here, the table gives an example where the hypercube algorithm is advantageous when: the number of computers n is 1<=n<8 and the number of transfer units is a or less; 0<=n<16 with b units or less; 17<=n<32 with c units or less; 33<=n<64 with d units or less; 65<=n<128 with e units or less; or 129<=n<256 with f units or less. In cases where the hypercube algorithm is advantageous, the hypercube algorithm is used (603), and otherwise the conventional method is used (604). The values a–f from the table are dependent on the properties of the computers used and will vary according to performance of one-to-one communications.

According to the invention described above, alltoall communications can be performed efficiently in accordance with the number of active computers and the number of transfer data units.

What is claimed is:

1. A method of performing parallel communication for a parallel computer system comprising n computers (n being a positive integer) which are respectively assigned unique identifying numbers and including means for communicating sending and receiving non-contiguous data formed from m fixed-length blocks (m being a positive integer) stored in a storage means of said computers, the method comprising the steps of:

if the number of said computers is not a power of 2, allocating for each of said computers in said storage means first and second areas, each area being capable of storing M data blocks, M being the smallest power of 2 larger than said non-contiguous block count m; forming an N×M block region from N-n second areas and said first area, where N is the smallest power of 2 larger than said number of computers n; and using said the N×M block area to send and receive non-contiguous data.

2. A method for performing parallel communications as recited in claim 1 wherein, when selecting said the second area forming said N×M block area, said the second area of a computer for which an exclusive OR of N/2 and said identification number of said computer is greater than said number of computers n is used.

3. A method for performing parallel communications as recited in claim 1 wherein, when sending non-contiguous data between said computers, sending and receiving is performed on an even-numbered block in said storage means of a first computer, where a plurality of contiguous blocks in said non-contiguous data serves as a unit, and an odd-numbered block in said storage means of a second computer, where said plurality of contiguous blocks in said non-contiguous data serves as a unit.

4. A method for performing parallel communications as recited in claim 1 wherein, when said computers send and receive non-contiguous data to each other in a plurality of times, the number of blocks sent and received at a k-th step (with k being a positive integer where 0<=k<=L-1 and L being a positive integer where $N=2^{}L$) is $2/2^{}(k+1) \times (m/n)$.

5. A storage medium holding a program capable of being executed on a parallel computer system that implements a method for performing parallel communications as recited in claim 1.

* * * * *